United States Patent
Neal et al.

(10) Patent No.: US 6,324,534 B1
(45) Date of Patent: Nov. 27, 2001

(54) SEQUENTIAL SUBSET CATALOG SEARCH ENGINE

(75) Inventors: Michael Renn Neal, Superior; James Michael Wilmsen, Westminster; Christopher Wade Beall, Lafayette, all of CO (US)

(73) Assignee: Requisite Technology, Inc., Westminster, CO (US)

( * ) Notice: Subject to any disclaimer, the term of this patent is extended or adjusted under 35 U.S.C. 154(b) by 0 days.

(21) Appl. No.: 09/393,994

(22) Filed: Sep. 10, 1999

(51) Int. Cl.[7] ................................................... G06F 17/30
(52) U.S. Cl. .................................. 707/3; 707/1; 707/102; 707/103; 706/12; 706/45; 709/218; 709/224; 709/245
(58) Field of Search .................................. 345/419, 450, 345/850, 853, 854; 707/1, 2, 3, 4, 5, 6, 10, 100, 101, 102, 205, 513; 709/224, 218, 245; 706/12, 45

(56) References Cited

U.S. PATENT DOCUMENTS

| | | | |
|---|---|---|---|
| 4,468,728 | * | 8/1984 | Wang ........................................ 707/1 |
| 5,630,125 | * | 5/1997 | Zellweger ............................ 707/103 |
| 5,706,497 | * | 1/1998 | Takahashi et al. ........................ 707/5 |
| 5,781,772 | * | 7/1998 | Wilkinson, III et al. ................ 707/3 |
| 5,806,061 | * | 9/1998 | Chaudhuri et al. ....................... 707/3 |
| 5,832,526 | * | 11/1998 | Schuyler ............................... 707/205 |
| 5,924,090 | * | 7/1999 | Krellenstein ............................ 707/5 |

(List continued on next page.)

OTHER PUBLICATIONS

Kao, David et al., "Efficient Proximity Search in Multivariate Data", Proceedings of the Tenth International Conference on Scientific and Statistical Database Management, Jul. 1–3, 1998, pp. 145–154.*

Lee, Jinho et al., "Integrating Structured Data and Text: A Multi-dimensional Approach", Proceedings of the 2000 International Conference on Information Technology: Coding and Computing, Mar. 27–29, 2000, pp. 264–269.*

Park, Sanghyun et al., "Efficient Searches for Similar Subsequences of Different Lengths in Sequence Databases", Proceedings of the 16th International Conference on Data Engineering, Feb. 29 –Mar. 3, 2000, pp. 23–32.*

*Primary Examiner*—Hosain T. Alam
*Assistant Examiner*—Shahid Alam
(74) *Attorney, Agent, or Firm*—Blakely, Sokoloff, Taylor & Zafman LLP

(57) ABSTRACT

An electronic catalog search engine is configurable to optimize the search process by identifying the desired item from the most advantageous supplier, while efficiently utilizing computing resources. The search engine comprises a configurable search and data subset creation mechanism. The system accepts search terms from a user, and then executes a sequence of search strategies on subsets of the database which may include a proximity search, a word count search, and a fuzzy logic search. Subsets can be searched in any order and different search strategies can be applied to different subsets. The sequences are terminated when search steps have uncovered at least one match. Each database entry has a corresponding product category. A list of categories from each of the matching products is dynamically compiled and displayed to the user. The user can page through the list of displayed matches, or alternatively can create a subset of the list by selecting only the items within one of the categories. In addition, the user can further refine the list of items by selecting those items having a particular attribute. The invention has the advantage that users with a wide range of skills and/or familiarity with products can quickly find the products that they need. The system has the additional feature of creating electronic requisitions for the products listed in the database.

13 Claims, 3 Drawing Sheets

U.S. PATENT DOCUMENTS

| | | | | |
|---|---|---|---|---|
| 5,995,971 | * | 11/1999 | Douceur et al. | 707/102 |
| 6,012,053 | * | 1/2000 | Pant et al. | 707/3 |
| 6,014,659 | * | 1/2000 | Wilkinson, III et al. | 707/3 |
| 6,018,735 | * | 1/2000 | Hunter | 707/5 |
| 6,026,398 | * | 2/2000 | Brown et al. | 707/5 |
| 6,111,578 | * | 8/2000 | Tesler | 345/356 |
| 6,125,361 | * | 9/2000 | Chakrabarti et al. | 707/3 |
| 6,157,922 | * | 12/2000 | Vaughan | 706/46 |
| 6,230,154 | * | 5/2001 | Raz et al. | 707/3 |
| 6,259,451 | * | 7/2001 | Tesler | 345/419 |

* cited by examiner

FIG. 3 conduits connectors [SEARCH]

Select a category to expand your search:

[All Categories] [View Matching Categories...] [Product Index]
[Conduit Connectors] — 306

Items: 1-10 of At Least 100 Items that exactly matches one or more of the words.

[Compare] [Add to Cart] [View Cart]

● Table Display  ○ Visual Display

| Select | Category | Mfg Name | Mfg Part Num | Details | Description | Supp Name |
|---|---|---|---|---|---|---|
| ☐ | Conduit Connectors | THOMAS & BETTS CORP | 300TB | ⊟ | Flexible Metal Connector Tite Bite 3/8" 1/2" To 0.437" To 0.656" Opening | Grainger |
| ☐ | Conduit Connectors | THOMAS & BETTS CORP | 302TB | ⊟ | Flexible Metal Connector Tite Bite 1/2" 0.750" To 0.937" Opening | Grainger |
| ☐ | Conduit Connectors | THOMAS & BETTS CORP | 304 | ⊟ | Flexible Metal Connector Tite Bite 3/4" 0.906" To 1.093" Opening | Grainger |
| ☐ | Conduit Connectors | THOMAS & BETTS CORP | 306 | ⊟ | Flexible Metal Connector Tite Bite 1" 1.250" To 1.468" Opening | Grainger |
| ☐ | Conduit Connectors | THOMAS & BETTS CORP | HC110 | ⊟ | Set Screw Connector 2 Screw Zinc Plated Steel For 4" | Grainger |

[NEXT]

SEQUENTIAL SUBSET CATALOG SEARCH ENGINE

BACKGROUND OF THE INVENTION

1. Field of the Invention

The present invention relates to computer software for database manipulation, and more particularly to a system and method for cascading search methodologies on selected sets of data from one or more electronic catalogs.

2. Background of the Invention

Searchable electronic catalogs are commonly used in support of various electronic commerce and purchasing functions. These catalogs must have a user interface for selectively retrieving data records. Engineers desire to make the user interfaces as simple as possible to operate, because complexity of the user interface can be a detriment to sales from the catalog. Simplicity becomes particularly important when the catalog is intended to be accessed by users with varying levels of skill or training. In particular, the results of the search should quickly and easily direct the user to the most desirable supplier or source for the requested goods.

User interfaces that are simple to operate should have the capability to handle almost any type of user input. In the case of an electronic catalog, if the user knows the exact part number of the desired product and enters the part number correctly into the user interface, then the database search engine will quickly identify the desired record from the database based on an exact match with the search string. In a more general case, the user may have only partial information about the desired product, or may incorrectly type the search string.

Similarly, the output of the search should be easy to understand. In an era when large accumulations of data are often available, there may be very large aggregations of catalog data in which to search and retrieve items. Ideally, a catalog search engine would have a mechanism for systematically searching through large electronic catalogs so that only the most relevant results are displayed to the user.

An over-abundance of catalog data can be problematic for at least two reasons: (1) the desired item may be available from many different suppliers, which creates a needlessly confusing array of output options for the user; and (2) computer system resources are expended to needlessly search for the desired item in the entire catalog database when a smaller, faster search would have uncovered the item from a preferred supplier. Managing the output options available to a user may be is particularly important in a corporate context in which individual employees are given the option of ordering their own supplies. In such a system, managers may wish to define a particular hierarchy of suppliers and enforce that hierarchy on users by only displaying the most desirable sources for items.

Previous systems have not adequately addressed the problems of searching large accumulations of catalog data and reporting the results in an efficient manner. Danish et al. in U.S. Pat. No. 5,715,444 disclose a process for identifying a single item from a family of items in a database. A feature screen and search process present the user with a guided nonclassification parametric search to identify matching items based upon user specified criteria and priorities. Also disclosed are a method and system appropriate in an Internet environment.

Cochran et al. in U.S. Pat. Nos. 4,879,648 and 5,206,949 disclose a method of variably displaying search terms in which two control inputs are used to select a plurality of terms for a plurality of categories. A term in a visible position on the screen becomes a search term or a qualifier for other records in the database. The search results are dynamically formed on the basis of selected search terms. The search results can also be grouped in fixed or static lists.

More recently, Aalbersberg in U.S. Pat. No. 5,946,678 discloses a user interface for document retrieval in which each query word is displayed by means of a distinctive representation. In a subsequent results window, each document header or title is accompanied by an indicator which employs the same distinctive representation to directly indicate to the user the relative contributions of the individual query words to each listed document. The distinctive representation can take several forms, such as by a different color or by means of hatching or shading or by displayed icons.

Efficiently searching through an electronic catalog has been the focus of much effort. Prior catalog search algorithms typically employ one of two search strategies. The first strategy is a keyword search for selecting database records based on matching text strings. The second strategy is a classification search for selecting database records based on lists of classifications from which to narrow and select the database records. Each of the two search strategies has disadvantages that can make it difficult for users to find their desired database records.

The keyword search strategy has the disadvantage that users must be familiar with the appropriate key word terms that are likely to yield the desired data records. In addition, it is not always possible to quickly collect groups of logically related data records. If a close match is found, but it is not the desired exact match, it is not always possible to utilize the information in the close match to quickly identify all similar data records. A keyword search engine does not typically have a "more-like-this" function that operates on close matches to identify similar items within the database.

The classification search strategy can take advantage of a logical grouping of data records. This search strategy is best suited for finding data that break down logically into successively greater levels of detail. This search strategy is most effective when the data have been carefully edited and structured within a database. Finding a single relevant record can quickly lead to all other relevant records, as long as the grouping logic relates to the way in which the data are used. Thus, a "more-like-this" function can quickly identify all similarly classified records in the database.

The disadvantage of the classification search strategy is that users may not always anticipate the proper classification of certain records, and may search the wrong categories for their desired database record. The user is tied to the logical structure of the data, and must learn to navigate the predefined structure of the database in order to locate particular data records.

Whether a search is conducted by keyword or classification strategy, the focus is on finding a particular item. In some cases the item is available from more than one supplier. In other cases, there may be more than one different kind of item, available from more that one supplier, that will satisfy the user's needs. In any case, it would be desirable to further refine the search methodology so that the most advantageous supplier is quickly identified to the user. It would also be desirable to avoid the computer processing time that would otherwise be needlessly expended on searching through less desirable supplier catalogs when the item has already been found.

It would be further desirable to have a simple user interface, both for inputting search terms and reviewing results. On the input side, the software should allow freeform text searching, with no prerequisites for format or content. Thus, it would be desirable to have a system capable of identifying the database records most likely to be the desired choice of the user, even when user inputs a search string having misspelled terms, word fragments, or other characteristics of the item being sought. On the output side, the software should only display the most advantageous sources for items, especially when the items are available from many different sources.

In many commercial situations, it would be advantageous to be able to configure the search behavior for a variety of factors. In addition to providing a simple user interface, it would be desirable to segment a database of searchable items into multiple tiers. The combination of search strategy and database segmentation would enable the identification of items from the most economical sources. It would also enable system managers to adjust the results based upon changing factors. Finally, such as system would efficiently use computing resources. These, and other technical and business aspects of catalog search engines, are the motivating factors for the invention that is described herein.

SUMMARY OF THE INVENTION

The present invention is a system and method for cascading search methodologies on preselected segments, or sets, of data. Each data set is paired with one or more search strategies so that the overall effect is to supply the user with the most advantageous match to a keyword search. Search strategies may include one or more of the following: exact search, stem search, soundex search, and fuzzy logic search. Data sets may be preselected based on source, shipping availability, or any other business reason for choosing, one supplier or source over another.

During a search, a user inputs one or more search terms to identify a desired item from an electronic catalog. The search engine of the present invention employs the designated search methodology upon its corresponding data set. The hierarchical order of the data sets is established by a system manager based on the desirability of procuring an item from a particular supplier or source. Once the item has been found, the search engine terminates its search, thereby saving the computing resources from needless searches through the remaining data sets.

In one embodiment of the invention, the system is configured to search first within a catalog (or data set) of items that are designated as in-house, and then to fail-over to a second tier catalog (or data set) of vendor-supplied items available for short-term delivery. If both searches fail to yield an acceptable result, the search engine may fail-over to special order suppliers with longer lead times for delivery. One advantage to the user is that the first search result will often be the most desirable option available.

The text searching can be improved through the use of sequential search algorithms that are designed to maximize the chances of identifying the desired data records. For example, several different search algorithms can be employed upon the most desirable data set to increase the chances of finding an appropriate item within that data set. For less desirable sources, it may be advantageous to only search for exact matches of the search term.

According to the present invention, a method of selecting data records in a catalog database comprises the following steps: inputting search terms to a user interface; testing the search terms against a sequence of data sets using search algorithms designated for each data set; and terminating the sequence of search algorithms when at least one database record satisfied the search criteria. In some embodiments of the invention, the algorithm may be expanded by compiling a unique list of classifications from each identified record to aid the user in further refining the search terms.

The invention comprises a database along with a search engine. The database may consist of an aggregate of supplier catalogs, in which each data record further consists of category descriptions, manufacturer's name, manufacturer part number, short text description, and parametrically composed descriptions. Each of the items within the data record may be organized by fields.

The available search algorithms according to the present invention may comprise proximity searching, string matching, stemming, fuzzy logic, and soundex matching. In certain embodiments, multiple search algorithms may be performed on a data set. For example, if an exact match is found, the search halts when all exact matches have been identified, and there is no further recourse to other search algorithms. If no exact match is found, then the search terms are manipulated to identify strings with similar roots. If, again, no match is found, the search terms are tested further according to other algorithms, such as fuzzy logic and soundex, until a match is found or the search engine reaches its logical termination.

One of the aspects of the search strategy is that the searchable terms include the predefined classification terms as well as other attributes and parameters of each catalog entry. This means that the freeform text input will show text string matches against any classification name or parametric name. This feature enhances the possibility of finding the desired data record based on the keyword search engine.

Each catalog entry may have one or more associated classifications according to type, and a list of unified classifications may be compiled dynamically from the identified matches. Dynamic compilation refers to the process of continuously updating the list of classifications whenever new matches are identified within a data set. This insures that the list continuously and accurately reflects the range of classifications of the identified matches. The list is unified in the sense that each classification is listed only once, even when the identified matches have multiple records with the same classification. The classification list is presented to the user along with the list of matches as an aid to the user for further refining the search methodology.

The invention has the unique aspect of allowing dynamic searching of subsets or blocks of databases with a combination of any of multiple search methodologies supported by the software. A system manager can specify which data sets or catalogs are searched first and in which sequence they are searched. Each block or data set of a particular catalog can be searched with a different strategy. A particular combination of search methodologies can be assigned to a user of the invention by name and password. Data suppliers also have the ability to request special priority for the searching of their data type.

Those skilled in the art will recognize the benefits and objects of this invention, which include but are not limited to the following: providing a database search engine that can quickly and easily lead users to a desired database record; combining the benefits of keyword searching with the benefits of classification searching; providing an interface that will process any type of user entry, including misspelled words and word fragments; increasing the efficiency of the search process by first searching in the most desirable data sets; and providing a search engine and database structure that maximizes the likelihood of finding the desired database records based on a simple user interface.

BRIEF DESCRIPTION OF THE DRAWINGS

These and other features and advantages of the present invention will become apparent from the following detailed description, taken in conjunction with the accompanying drawings, wherein:

FIG. 3 is an example user interface according to one embodiment of the present invention.

DETAILED DESCRIPTION OF THE INVENTION

Figure 1:
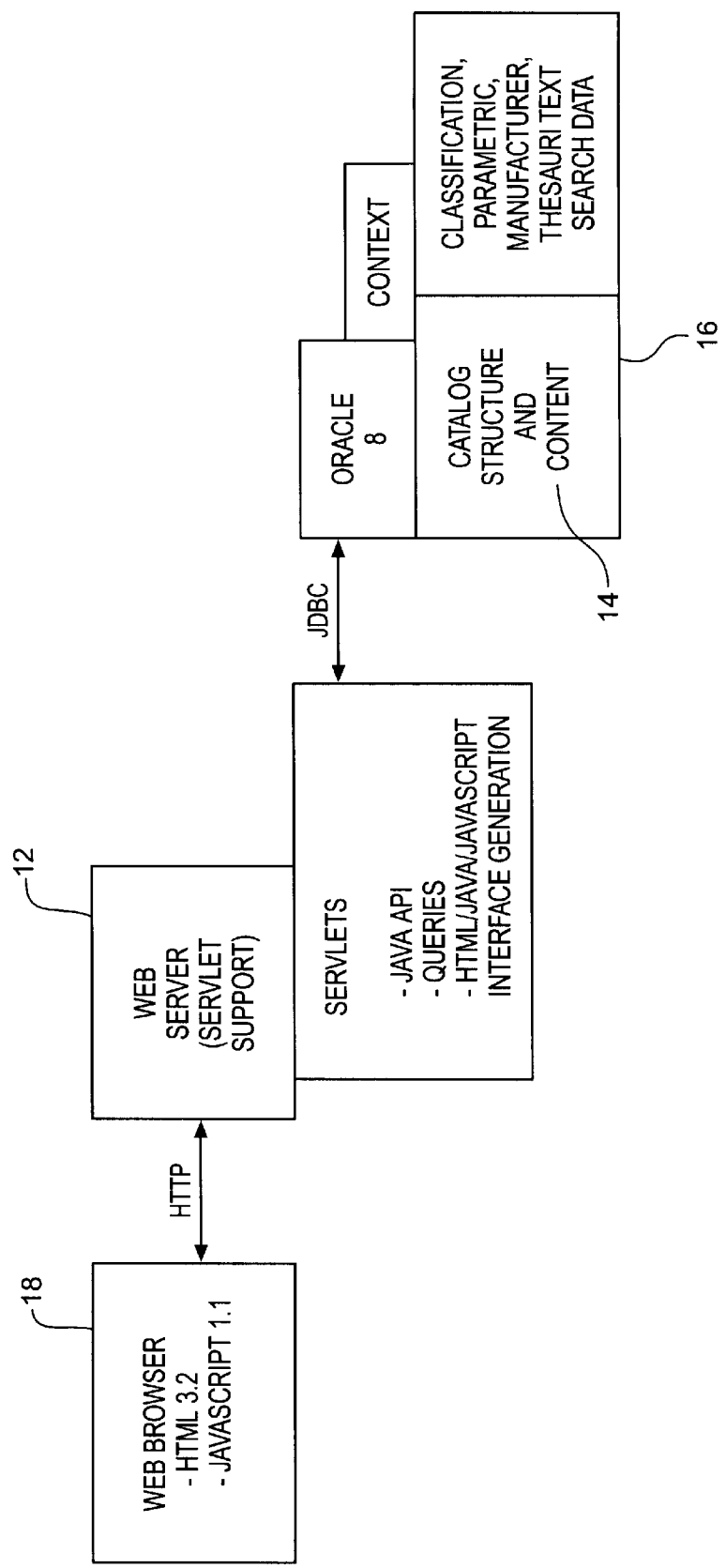
FIG. 1 is a block diagram representation of one embodiment of an electronic catalog requisition system.

FIG. 1 is a functional block diagram representation of an electronic catalog and automated purchase requisition system. An application server 12 is connected to interact with a database 14 which resides in a computer memory storage device 16. Users of the system have workstations 18 that are connected to the application server 12 through a wide area network such as the Internet. Commands entered into the web browser cause information to be extracted from the database 14 and displayed at the workstation 18.

The database 14 contains an electronic listing of products. The database 14 is constructed in a manner such that it can be subdivided, and each subdivision searched separately. For example, the subdivisions may be according to in-house items and out-of-house items. Alternatively, the subdivisions may be according to various suppliers, including the most favored suppliers, followed by other less-favored suppliers. In yet another embodiment, the subdivisions may be arranged according to the fastest delivery dates, such that if the same item is available from more than one supplier, the supplier with the fastest delivery date will be shown first to the user.

The mechanism for subdividing the database may be any of the well-known mechanisms for identifying or grouping data records. The subdivisions need not be related to the physical storage location of the record within the database. For example, data sets may be created by having certain field values within the data record. This would be used, for example, to create a data set comprising all data records from a particular vendor. Alternatively, data sets may be created by grouping certain data records into files. In yet another embodiment, software objects may be used to encapsulate certain data to define sets.

In one embodiment of the invention, the software 10 is configured to access one of several electronic catalogs in the database 14. The database 14 is typically an aggregate of product information from multiple suppliers. The same item may be listed several times in an aggregated catalog from different suppliers. According to the present invention, the more favored suppliers can be searched first in a hierarchy of cascading searchable data sets. The particular hierarchy is predefined by a system administrator based on the desirability of purchasing items from a particular supplier, or based on particular incentives that may be offered by a supplier for the privilege of being moved up the hierarchy.

There are significant advantages to a supplier for having its catalog searched first, because in certain embodiments of the invention only the first exact match is reported to the user. Suppliers may compete with each other for a more advantageous position on the cascade of searchable data sets. In certain embodiments of the present invention, in which only the first exact match is displayed to the user, a supplier will not have to worry about head-to-head price comparisons with other suppliers for stock items.

The type or format of each catalog in the database 14 may be varied as long as the catalog will respond appropriately to a text query from the software 10. For example, the catalog may reside within a relational database or may reside within an object-oriented database.

Referring back to FIG. 1, the storage device 16 may be a disk drive, a tape drive, RAM, or any of the known computer data storage devices. The application server 12 may reside in a computer attached directly to the storage device 16, or alternatively may be connected to the storage device 16 through a network. In each case, the application server 12 queries the database 14 and directs the results to the workstation 18.

Software 10 is executed within the application server 12. The software 10 follows an algorithm 200 as shown in the logic block diagram of FIG. 2. The user inputs a search string, as shown in block 202. In the preferred embodiment, the search string is free-form, meaning that the string may be any combination of alphanumeric characters or search terms, and no particular syntax is required. Also in the preferred embodiment, the search string may comprise search terms in any order. For example, the search string could include the name of an item, a part number for an item, or any descriptive attribute of the item. The software 10 is designed to handle misspellings, word fragments, or any other string that may lead a user to find the desired product within the database 14.

Once one or more search have been entered, the algorithm 200 proceeds along the logical path 204 to a first search strategy shown by block 206. The search strategy consists of a data set and a search methodology. The first search methodology, for example an "exact string search," is applied to the first data set, for example a preferred supplier catalog. If the preferred supplier has the exact item, a match will be recognized by the algorithm 200 and the logic will proceed along schematic lines 228 and 234 until the results of the match are reported to the user in block 236. The algorithm then preferably terminates in block 226, although there may be additional steps associated with payment and order fulfillment.

If the first search methodology, as applied to the first data set, does not yield a match, the algorithm 200 proceeds along schematic line 208 to the second search strategy in block 210. The second search strategy has a second data set and a second search methodology. In general, there is no requirement that the second data set must be different from the first data set. For example, if the first search strategy in 206 failed because there was no exact string match, it may be desirable to perform a stem search on the same data set. In that way, the preferred supplier may have more than one chance of identifying the desired item within its catalog.

Similarly, in the preferred embodiment there is no requirement that the second search methodology in 210 must be different from the first search methodology in 206. For example, if the first preferred supplier did not yield an exact string match to the input search term, the same search methodology could be applied to a second preferred supplier's catalog.

A system manager implements the algorithm 200 by preselecting the data sets and search methodologies to yield the most efficient business strategy. The ordering of the search strategies, or the particular data sets and search methodologies therein, can be updated as needed to reflect changing business conditions. For example, if a particular supplier offers a temporary incentive plan, it may be advantageous to temporarily move that supplier's data set (or catalog) to the top of the hierarchy in order to fulfill as many items as possible during the period of the promotion.

Figure 2:
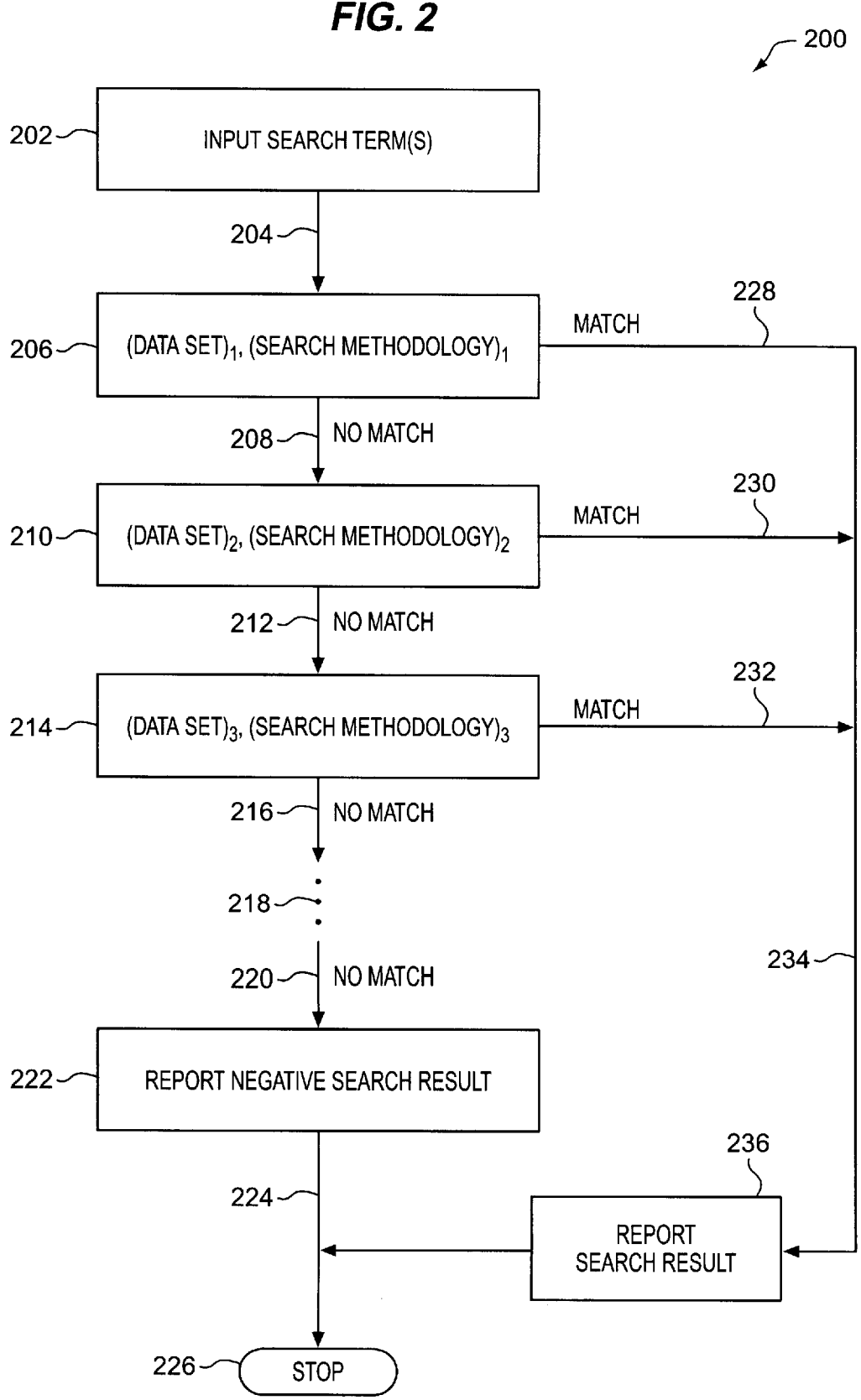
FIG. 2 is a logic block diagram representation of a sequential search methodology according to the present invention.

Continuing with FIG. 2, if the second search strategy in 210 fails to yield a match, the algorithm 200 continues along 212 to the third search strategy in 214, and thereafter along line 216 until a match is found. The three vertical dots shown in 218 are meant to schematically illustrate that the number of search strategies is arbitrary.

In the preferred embodiment, the system manager will expand the scope of the search strategies from "exact" string matches, along a continuum of search methodologies, including perhaps fuzzy logic strategies. In this context, a fuzzy logic algorithm may also be known in the art as a "word wheel" or other name associated with an algorithm for testing combinations and permutations of the alphanumeric characters in the search string. The intent of a fuzzy logic search is to identify products in the database 14 having any descriptive similarity to the search string. For example, a user who enters a search string having a typographical error will not generally find an exact match within the database 14, but a fuzzy logic algorithm may select the desired product on the basis of similarity with the search string. The purpose of expanding the search strategies is to avoid the situation wherein the search fails to identify the desired item from any data set, and thereby drops into logical block 222 a negative search result is reported to the user.

The software 10 preferably has a single text box for search strings, shown as box 300 of FIG. 3. The example search string in box 300 is "bic pen red" which represents a combination of manufacturer name, classification, and attribute. It has been found that users desire the simplicity of typing strings at a single location, without differentiating whether the string represents a product name, a product manufacturer, or a product attribute. Alternatively, there may be separate text boxes for different types of search strings.

The software 10 executes the algorithm 200 to identify the first data set that offers a red Bic pen. If the data sets are arranged such that the most preferable supplier is first, then the user will receive a positive search result from that preferable supplier. In this way, the system administrator can fulfill orders in the most efficient manner.

The software 10 may also rank the degree of similarity between each matched database record with the search string. For example, records with a larger number of alphanumeric character matches against the search term will be ranked higher than records with only a few matching characters. Ranking algorithms are found in several commercially available software packages including Oracle 8.

There are many possible sequences of search algorithms, but in general it is desirable to execute the narrowest, or most specific, search first. The sequence should proceed with search algorithms according to the scope of each algorithm. For example, a search for the specific search string is the narrowest in scope, whereas a search for related search strings will be broader in scope because it will likely return a wider range of matches. In one embodiment, the user may select the sequence of search algorithms that is applied to one or more data sets. In an alternative embodiment, the sequence of search algorithms is preset by a system administrator.

An additional type of search algorithm not specifically shown in FIG. 2 is a "soundex" or "sounds-like" search, in which the search string is tested against database records for similarity in sound. Various implementations of soundex search algorithms are known in the field.

If any match is found as a result of a search algorithm, the successive search algorithms will be skipped and the software 10 will proceed to display the results. If the software 10 has been configured to add price and vendor information, that may also be added to the display.

In the preferred embodiment, the display have several areas of information, as shown in FIG. 3. The search string is shown in a text box 300, preferably located in the upper-left corner of the display. The matching item is shown in a display list 302. The display list 302 includes the category, the manufacturer name, the manufacturer part number, and descriptive attributes.

As an alternative to paging though a lengthy list of products, the user can narrow the list by selecting one of the categories. For example, FIG. 3 shows that two different categories of items were found: pens and pen refills. Since there are 29 matching items (only the first 10 are shown), the selection of button 306 will narrow the list to include only pens and not pen refills. A new display will be generated, shown in FIG. 4, wherein the updated display list 402 has 27 items which do not include pen refills. In this embodiment, selecting a category will be restrictive in terms of the items in the display list 302. This procedure is shown as logic block 124 in FIG. 2.

In general, items within the catalog will have parameters that can be selected to restrict the display list 302. For example, a parameter for pens may be "ink color" and has values of blue, black, or red. In the event that pens are selected as a category, the display list 302 may be further restricted to pens of a single color. This process is referred to herein as parametric refinement.

In the preferred embodiment of the invention, the algorithm 200 will have a list of synonyms for each attribute. The search algorithms can replace individual search terms with appropriate synonyms for purposes of matching data records. The attributes are normally used as part of an algorithm for finding matches, and the use of synonyms for the attributes gives additional flexibility to the range of search strings that will produce meaningful matches.

Another way to increase the flexibility of the search algorithms is to allow natural adjectives in the search string to help select certain attributes. For example, if there is a category for computers, and the category has an attribute for processor speed, then the adjective "fastest" in the search string could be used to select the fastest computer. Slower computers would be eliminated from the display list 302.

Yet another way to increase the flexibility of the search algorithms is to assign categories alternative roles such as, but not limited to, problem spaces and applications. In this embodiment, the items found by the query are actually predefined queries that generate lists of actual data records from the database. Thus, selecting a category becomes equivalent to submitting a predefined query to the database.

The electronic requisition system can provide links to further information about items within the database. The further information can be stored within the database 14, or alternatively may be stored at a remote computer accessible through the Internet. For example, buttons on the display screen can invoke links to web sites that contain relevant information.

Items within the catalog are preferably cross-referenced so that related items can be quickly located. For example, if the user selects a printer from the catalog, the appropriate toner cartridge can be immediately located by pressing a button on the display list.

Once a user identifies the desired product from the database 14, the software 10 can generate a purchase requisition having preformatted price, vendor, and user information. Individual contract terms and pricing information can be accessed by the software 10 to be reflected in the requisition. The requisition can be sent electronically to the vendor for processing.

It will be apparent to those of skill in the appertaining arts that various modifications can be made within the scope of the above invention. Accordingly, this invention is not to be considered limited to the specific examples chosen for purposes of disclosure, but rather to cover all changes and modifications which do not constitute departures from the permissible scope of the present invention. Having thus described our invention, what is desired to be secured and covered by Letters Pat. No. is presented in the appended claims.

What is claimed is:

1. A method of selecting data records in a computer readable database, each data record having at least one classification, the method comprising the steps of:

designating a plurality of subsets of data records in a database;

designating at least a first and a second search strategy, wherein each search strategy comprises a search methodology preselected to operate upon at least one of the plurality of subsets to search for at least one match;

forming a search hierarchy comprised of the first search strategy followed by the second search strategy;

inputting a search string, comprising at least one search term, to a user interface;

executing the search hierarchy, wherein said search string is applied by a succession of said search strategies;

terminating said search hierarchy upon finding said at least one match;

displaying said at least one match.

2. The method of claim 1, wherein at least one of said plurality of subsets is a vendor catalog.

3. The method of claim 1, wherein said search methodology is a fuzzy logic search.

4. The method of claim 1, wherein said search methodology is a soundex search.

5. The method of claim 1, wherein said search methodology is a stem search.

6. The method of claim 1, wherein at least the first search strategy, when executed, fails to yield a matching result, and wherein the second search strategy, when executed, yields a matching result.

7. The method of claim 1, wherein a first subset represents items available in-stock, and a second subset represents items not available in-stock.

8. The method of claim 1, further comprising the step of reordering said search hierarchy.

9. The method of claim 1, further comprising the step of displaying a classification of said at least one match.

10. A system for selecting data records in a computer readable database, each data record having a classification, the database accessible to a computer, the system comprising:

a plurality of subsets of data records in the database;

at least a first and a second search strategy encoded within said computer, wherein each search strategy comprises a search methodology preselected to operate upon at least one of the plurality of subsets to search for at least one match;

an algorithm within said computer, said algorithm comprising a search hierarchy comprised of said first search strategy followed by said second search strategy;

a user interface connected to said computer, said user interface having an input for a search string, said input comprising at least one search term;

wherein executing the search hierarchy causes said search string to be applied by a succession of said search strategies, and wherein said algorithm terminates said search hierarchy upon finding said at least one match, and displays said at least one match on said user interface.

11. The system of claim 10, wherein at least one of said plurality of subsets is a vendor catalog.

12. The system of claim 10, wherein at least the first search strategy, when executed, fails to yield a matching result, and wherein the second search strategy, when executed, yields a matching result.

13. A method of selecting items in a computer readable electronic catalog, each item having a classification, the method comprising the steps of:

designating a plurality of subsets of data records in a database, wherein each subset corresponds to a different supplier;

designating at least a first and a second search strategy, wherein each search strategy comprises a search methodology preselected to operate upon at least one of the plurality of subsets to search for at least one match;

forming a search hierarchy comprised of the first search strategy followed by the second search strategy;

inputting a search string, comprising at least one search term, to a user interface;

executing the search hierarchy, wherein said search string is applied by a succession of said search strategies according to a preselected order of said suppliers;

terminating said search hierarchy upon finding said at least one match;

displaying said at least one match.

\* \* \* \* \*